(12) United States Patent
Riegels

(10) Patent No.: US 9,132,825 B2
(45) Date of Patent: Sep. 15, 2015

(54) METHOD AND APPARATUS FOR PREVENTING OVER-SHIFTING ON ELECTRIC VEHICLES

(71) Applicant: Brammo, Inc., Ashland, OR (US)

(72) Inventor: Daniel M. Riegels, Ashland, OR (US)

(73) Assignee: Brammo, Inc., Talent, OR (US)

( * ) Notice: Subject to any disclaimer, the term of this patent is extended or adjusted under 35 U.S.C. 154(b) by 0 days.

(21) Appl. No.: 14/160,027

(22) Filed: Jan. 21, 2014

(65) Prior Publication Data

US 2014/0249707 A1 Sep. 4, 2014

Related U.S. Application Data

(60) Provisional application No. 61/754,161, filed on Jan. 18, 2013.

(51) Int. Cl.
| | |
|---|---|
| *B60L 9/00* | (2006.01) |
| *B60W 10/08* | (2006.01) |
| *F16H 61/16* | (2006.01) |
| *B60W 10/11* | (2012.01) |
| *B60W 30/188* | (2012.01) |

(52) U.S. Cl.
CPC ............... *B60W 10/08* (2013.01); *B60W 10/11* (2013.01); *B60W 30/1884* (2013.01); *F16H 61/16* (2013.01); *B60W 2510/08* (2013.01); *B60W 2510/081* (2013.01); *B60Y 2200/91* (2013.01); *F16H 2061/166* (2013.01)

(58) Field of Classification Search
CPC .. B60W 10/08; B60W 10/11; B60W 2510/08
USPC .................... 701/22; 180/65.7, 65.8
See application file for complete search history.

(56) References Cited

U.S. PATENT DOCUMENTS

| | | | |
|---|---|---|---|
| 5,884,201 | A | 3/1999 | Kawai |
| 8,326,510 | B2 | 12/2012 | Tang et al. |

(Continued)

FOREIGN PATENT DOCUMENTS

| | | |
|---|---|---|
| JP | 2000-295720 A | 10/2000 |
| WO | 2004-033247 A2 | 4/2004 |

OTHER PUBLICATIONS

International Search Report and Written Opinion for PCT/US2014/012342, dated May 7, 2014.

*Primary Examiner* — Thomas G Black
*Assistant Examiner* — Luke Huynh
(74) *Attorney, Agent, or Firm* — Rajesh Vallabh; Foley Hoag LLP

(57) ABSTRACT

Methods and apparatus are provided for preventing overshifting in electric vehicles having a multi-gear transmission and an electric motor operable in a drive mode and a regenerative braking mode. The method includes: (a) predicting the speed of the electric motor resulting from downshifting from a current gear being used to a next lower gear based on a current speed of the electric vehicle, a current speed of the electric motor, and a gear ratio of the next lower gear; (b) determining if the speed of the electric motor predicted in (a) will cause an overvoltage condition from regenerative braking or an overspin condition in the electric motor; (c) preventing downshifting to the next lower gear when it is determined that the downshifting will cause an overvoltage condition or an overspin condition in the electric motor; and (d) repeating steps (a), (b), and (c) a plurality of times.

18 Claims, 11 Drawing Sheets

(56) References Cited

U.S. PATENT DOCUMENTS

| | | | |
|---|---|---|---|
| 8,682,518 B2* | 3/2014 | Jeon | 701/22 |
| 2008/0306643 A1* | 12/2008 | Hanyu et al. | 701/22 |
| 2010/0041512 A1 | 2/2010 | Silveri et al. | |
| 2012/0053767 A1* | 3/2012 | Jeon | 701/22 |

* cited by examiner

METHOD AND APPARATUS FOR PREVENTING OVER-SHIFTING ON ELECTRIC VEHICLES

CROSS REFERENCE TO RELATED APPLICATION

This application claims priority from U.S. Provisional Patent Application No. 61/754,161 filed on Jan. 18, 2013 entitled METHOD AND APPARATUS FOR INHIBITING OR PREVENTING OVER-SHIFTING ON ELECTRIC VEHICLES, which is hereby incorporated by reference.

BACKGROUND

The present application relates generally to electric vehicles such as, e.g., electric motorcycles, tricycles, and all-terrain vehicles (ATVs). More particularly, the application relates to methods and apparatus for preventing over-shifting on such vehicles.

One benefit of electric vehicles is the ability to re-capture energy during braking or on a downhill descent, often called regenerative braking—or "regen" for short. An electric motor, when supplied energy, will drive the traction wheel(s) of the vehicle, which then propel the vehicle forwards. When no energy is supplied to the motor, but the traction wheel(s) supply mechanical motion to the motor, the motor itself will become a generator supplying energy that can be used to assist in recharging the vehicle battery system. The higher the motor rotor is spun by mechanical means, the larger the voltage produced as a result.

For electric vehicles with a fixed gear system, the motor speed and corresponding output voltages are generally closely matched for the system it is designed into. With a gearbox equipped electric vehicle that supports selection between multiple gears, an issue arises that if a too low gear is quickly selected at high speeds, the resulting regen voltages become excessively large as the motor spins above maximum rated revolutions per minute (RPM). An example of this is a motorcycle with a multi-gear transmission traveling in one particular gear at maximum motor RPM, which then quickly downshifts one or more gears while maintaining the same or similar speed. The result would be the motor spinning faster than the maximum RPM speed allowed (overspin) with a resulting voltage generation that exceeds system design parameters (overvoltage), which can cause damage to the vehicle.

BRIEF SUMMARY OF THE DISCLOSURE

In accordance with one or more embodiments, methods and apparatus are provided to determine whether the effects of a new gear selection in an electric vehicle is safe or excessive before that gear is entered. If the new gear is determined to result in excessive regenerative voltages being produced, a mechanism is actuated to prevent the shift from completing. Two exemplary mechanical implementations for preventing shifting are described: one external to the gearbox and the other internal to the gearbox. The techniques for preventing over-shifting can be predictive (preventing shifting before it occurs) or reactive (preventing shifting after the shift sequence has initiated).

In accordance with one or more embodiments, a method is provided for preventing over-shifting in an electric vehicle having a multi-gear transmission and an electric motor operable in a drive mode and a regenerative braking mode. The method includes the steps of: (a) predicting the speed of the electric motor resulting from downshifting from a current gear being used to a next lower gear based on a current speed of the electric vehicle, a current speed of the electric motor, and a gear ratio of the next lower gear; (b) determining if the speed of the electric motor predicted in (a) will cause an overvoltage condition from regenerative braking or an overspin condition in the electric motor; (c) preventing downshifting to the next lower gear when it is determined that the downshifting will cause an overvoltage condition or an overspin condition in the electric motor; and (d) repeating steps (a), (b), and (c) a plurality of times.

An electric vehicle in accordance with one or more embodiments comprises an electric motor operable in a drive mode and a regenerative braking mode, at least one drive wheel, a multi-gear transmission connected to the electric motor and the at least one drive wheel for transmitting torque therebetween, an energy storage system for providing power to the electric motor in the drive mode and being rechargeable by the electric motor in the regenerative braking mode, a downshifting prevention apparatus, and a vehicle control unit to prevent over-shifting in the electric vehicle. The vehicle control unit is configured to (a) predict the speed of the electric motor resulting from downshifting from a current gear being used to a next lower gear based on a current speed of the electric vehicle, a current speed of the electric motor, and a gear ratio of the next lower gear; (b) determine if the speed of the electric motor predicted in (a) will cause an overvoltage condition from regenerative braking or an overspin condition in the electric motor; (c) actuate the downshifting prevention apparatus to prevent downshifting when the vehicle control unit determines that downshifting to the next lower gear will cause an overvoltage condition or an overspin condition in the electric motor; and (d) repeat (a), (b), and (c) a plurality of times.

DETAILED DESCRIPTION

Figure 1:
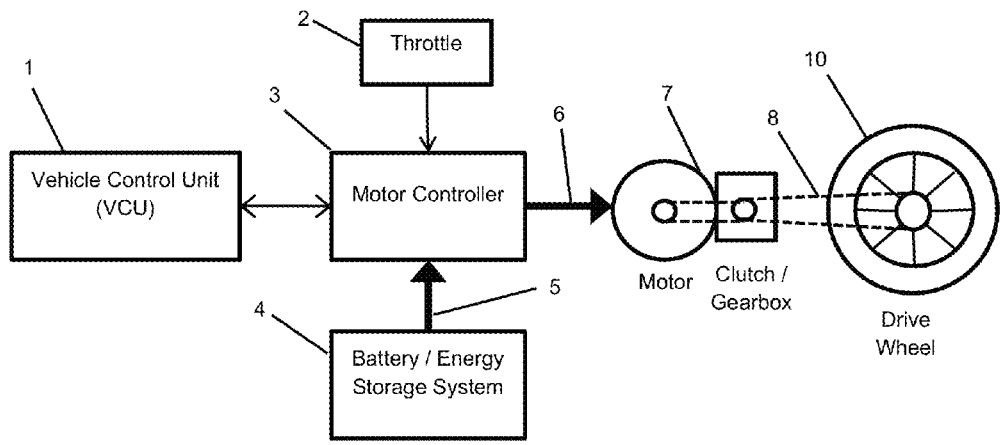
FIG. 1 is a simplified diagram illustrating select components of an electric vehicle in accordance with one or more embodiments in a drive mode.

FIG. 1 is a simplified diagram showing select components of a typical electric vehicle. The flow of power starts from the vehicle's battery system 4 which then goes to the motor controller 3, where it is modified to drive the motor 7 depending on a variety conditions. The vehicle's throttle 2 regulates the speed and is interpreted by the motor controller 3, which then adjusts the flow of energy 6 to the motor. Additional conditions such as the position of the key switch, drive modes (economy, sport, etc.), error conditions (e.g., kickstand down on a motorcycle) are controlled by the vehicle's control unit 1 have additional control over the vehicle state and thus will influence what the motor controller delivers to the motor. Drive linkage 8 to the drive wheel 10 can be through a variety of mechanical mechanisms (e.g., chains, belts, shafts), and the particular drive linkage is not a limitation of this patent. In addition, the Battery/Energy Storage System 4 can be generally any form of rechargeable energy storage and is not a limitation of this patent.

Figure 2:
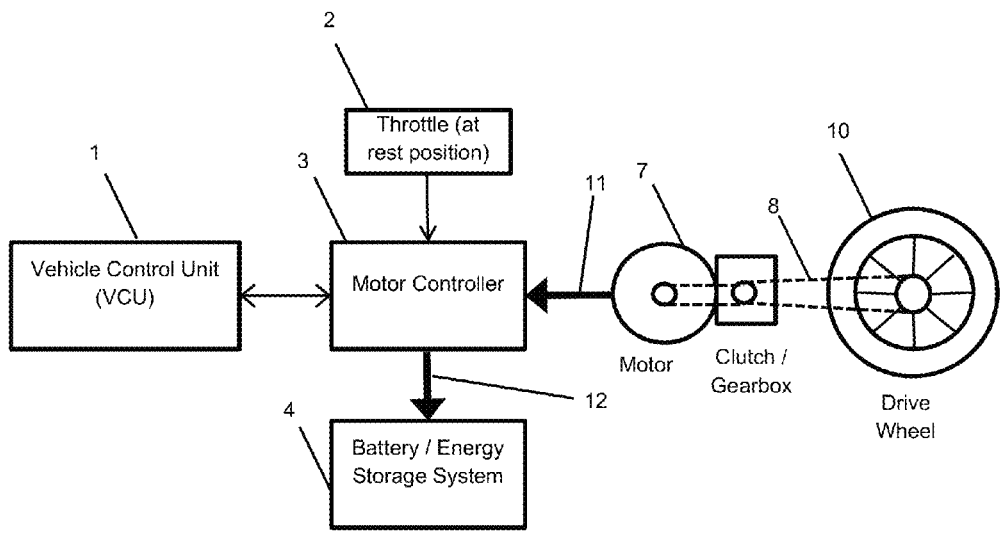
FIG. 2 is a simplified diagram illustrating select components of an electric vehicle in accordance with one or more embodiments in a regen mode.

In FIG. 2, the flow is reversed as the vehicle is using mechanical energy from braking to drive the motor 7, which then generates electricity 11 transferred to the motor controller 3 where it can then use that energy 12 to re-charge the vehicle's battery system 4.

Figure 3:
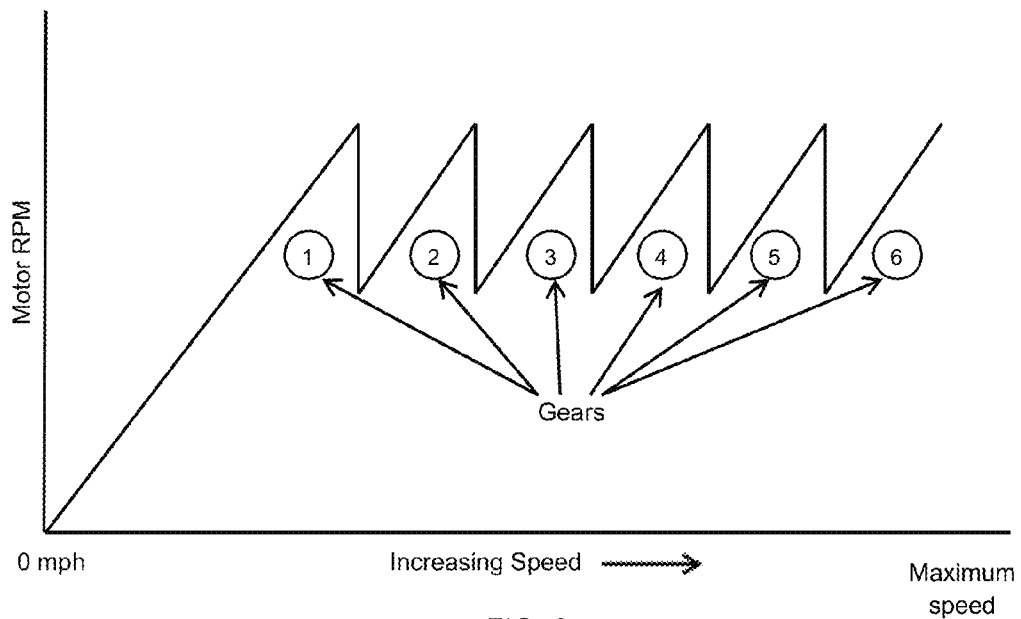
FIG. 3 is a graph showing typical gear selection when shifting up through various speeds.
Figure 4:
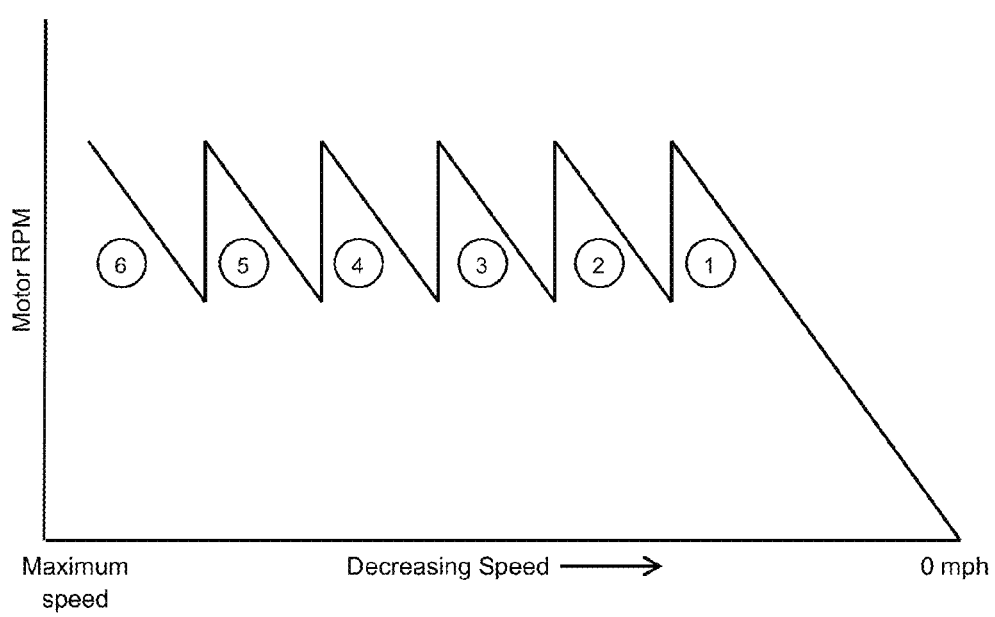
FIG. 4 is a graph showing typical gear selection when downshifting through various speeds.

FIG. 3 is a simplified diagram illustrating the normal sequence for shifting upwards in gears. This example uses a 6-speed gearbox transmission (shown as gears 1 through 6). However, it should be understood that that methods and apparatus in accordance with various embodiments can be applied to transmission gearboxes with any number of multiple gears. Conversely, for downshifting (shown in FIG. 4), the sequence is reversed. (For clarity, the horizontal axis in FIG. 4 is reversed in direction from that shown in FIG. 3).

In the regen mode, the motor produces a voltage output proportional to the speed (RPM) of the motor. The voltage produced is defined as:

$$\text{Motor Voltage} = K_e \times \text{RPM}$$

where $K_e$ is the Motor Voltage constant and RPM is the revolutions per minute of the motor.

Figure 5:
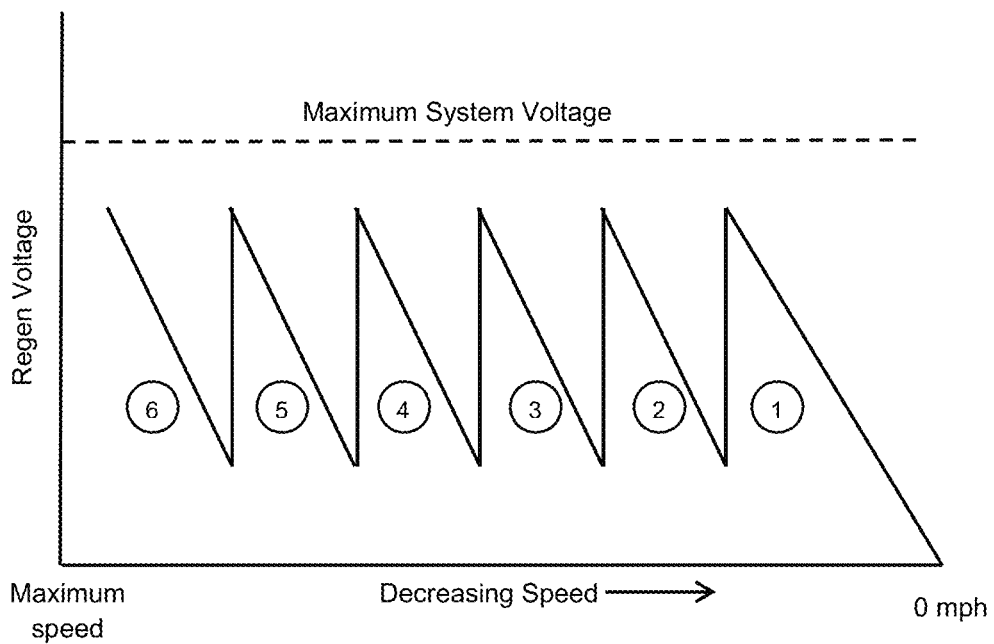
FIG. 5 is a graph showing exemplary voltage generation during a regenerative mode.

Due to this linear relationship between the motor's RPM and the voltage output, the voltages produced during regen when shifting down have a similar shape to the motor's speed. The voltage output of the motor is shown in FIG. 5 and is similar in shape to the RPM shown in FIG. 4. The higher the RPM of the motor, the greater the voltage produced.

Figure 6:
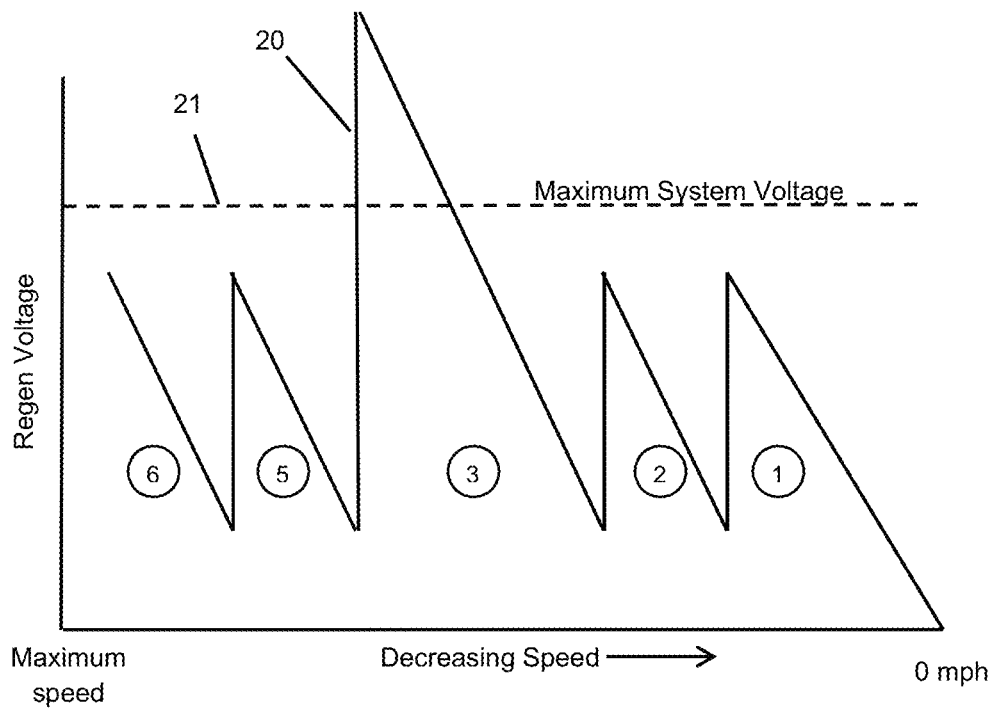
FIG. 6 is a graph showing an example of overvoltage when double shifting down (motor overdrive).

When a driver shifts from a higher gear at maximum motor RPM to a lower gear (or double-shifts two gears at once) downward, the motor can spin beyond parameters designed for the motor itself. In addition, due to the excessive spinning of the motor, the voltages produced on the output, e.g., at 20, can be higher than the designed maximum 21 for the system as shown in FIG. 6.

Figure 7:
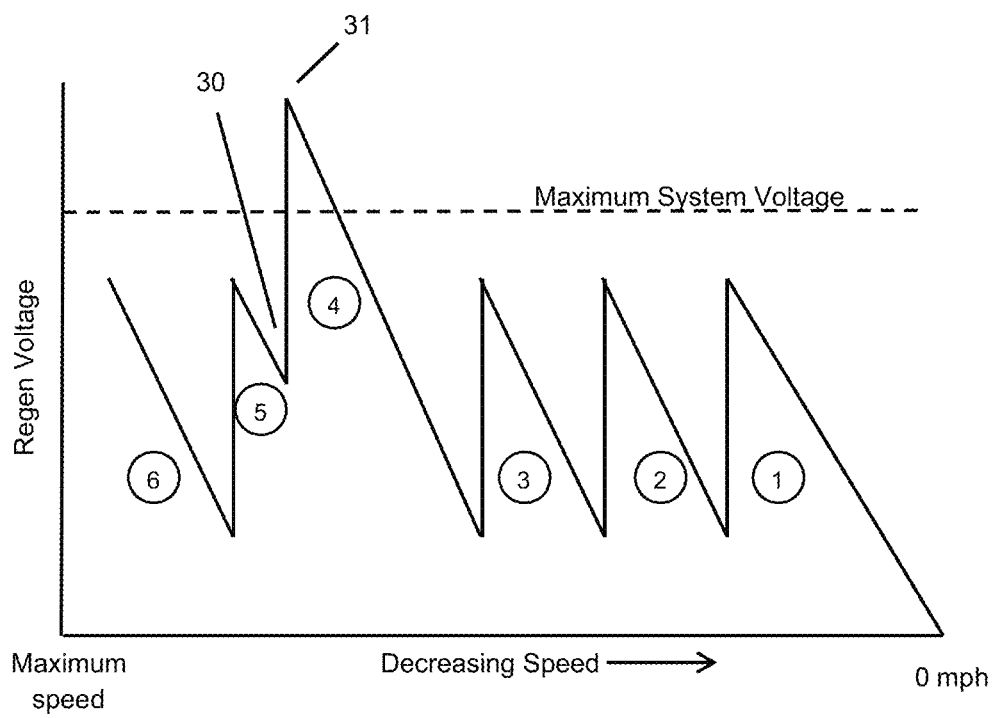
FIG. 7 is a graph showing an example of overvoltage from shifting down too early (motor overdrive).

The same effect can also come from downshifting too early at 30, which can cause a motor to spin faster than the system is designed to handle, and thus cause an overvoltage condition at 31 as shown in FIG. 7.

To prevent this overspin or overvoltage condition, the gears selected should be within specified motor RPM ranges, and no gear should be selected that would cause the motor to enter overspin or produce a voltage greater than what the system is designed for.

Figure 8:
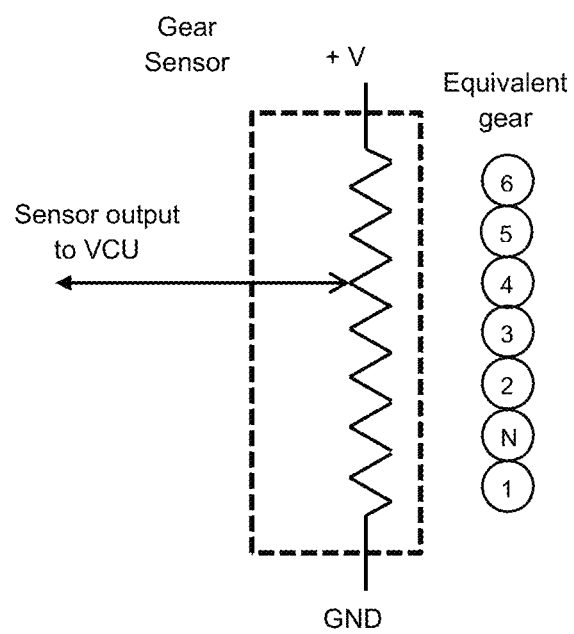
FIG. 8 is a simplified diagram illustrating an exemplary gear position sensor.

The current gear selection can be determined by a gear position sensor. As an example, a resistive sensor is discussed in embodiments illustrated herein, but it should be understood that a variety of other sensors (optical, magnetic, etc.) can also be used. An exemplary resistive sensor is shown in FIG. 8 with corresponding gears. In this example, the higher the gear selection, the higher the voltage output from the sensor. As the output is linear (analog), intermediate positions can also be determined, including the direction of the shift before it shifts completely out of the current gear and into the next. Digital sensors have also been developed for gear position sensors, and can be used in this application.

Figure 9:
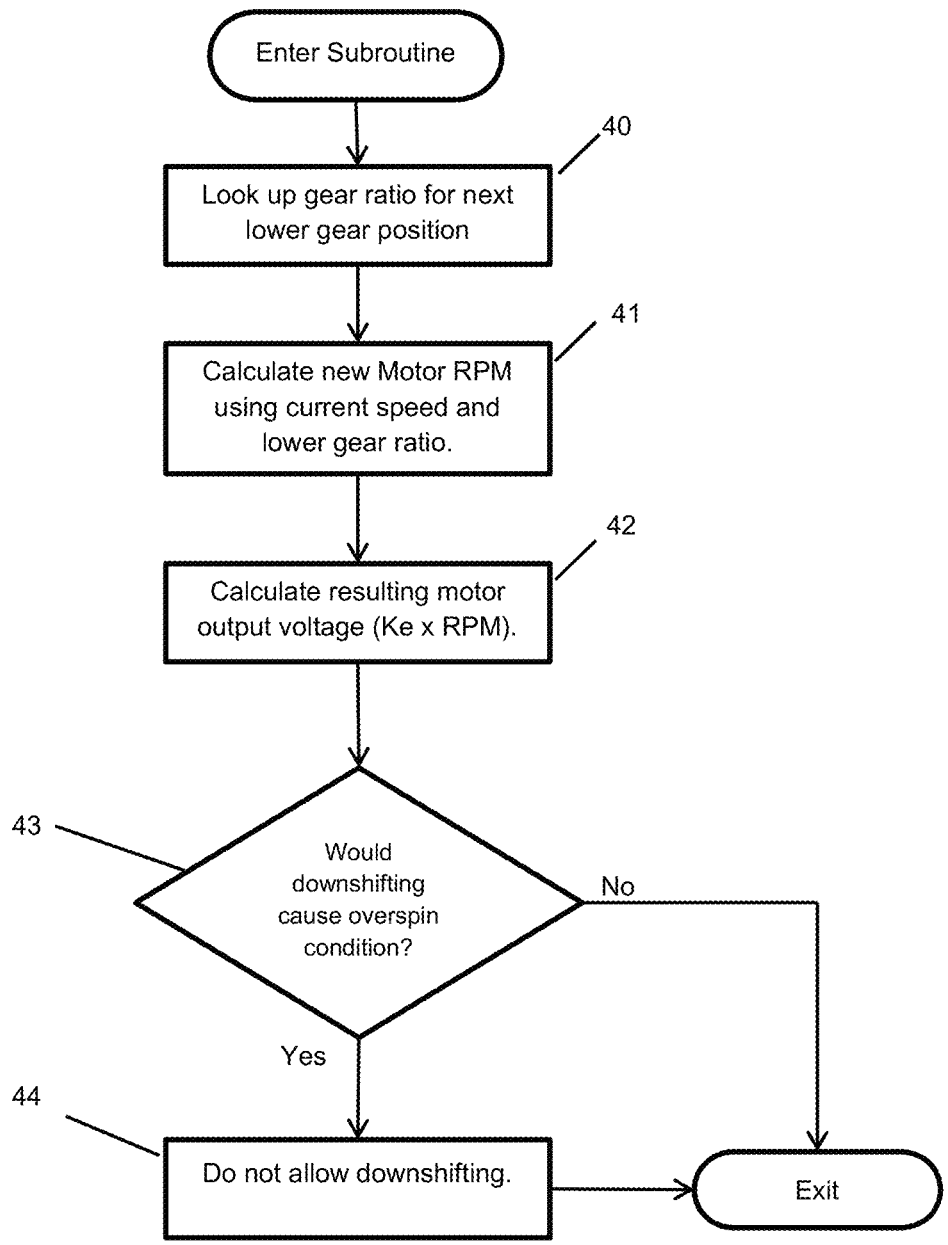
FIG. 9 is a flowchart illustrating an exemplary predictive gear selection process in accordance with one or more embodiments.
Figure 10:
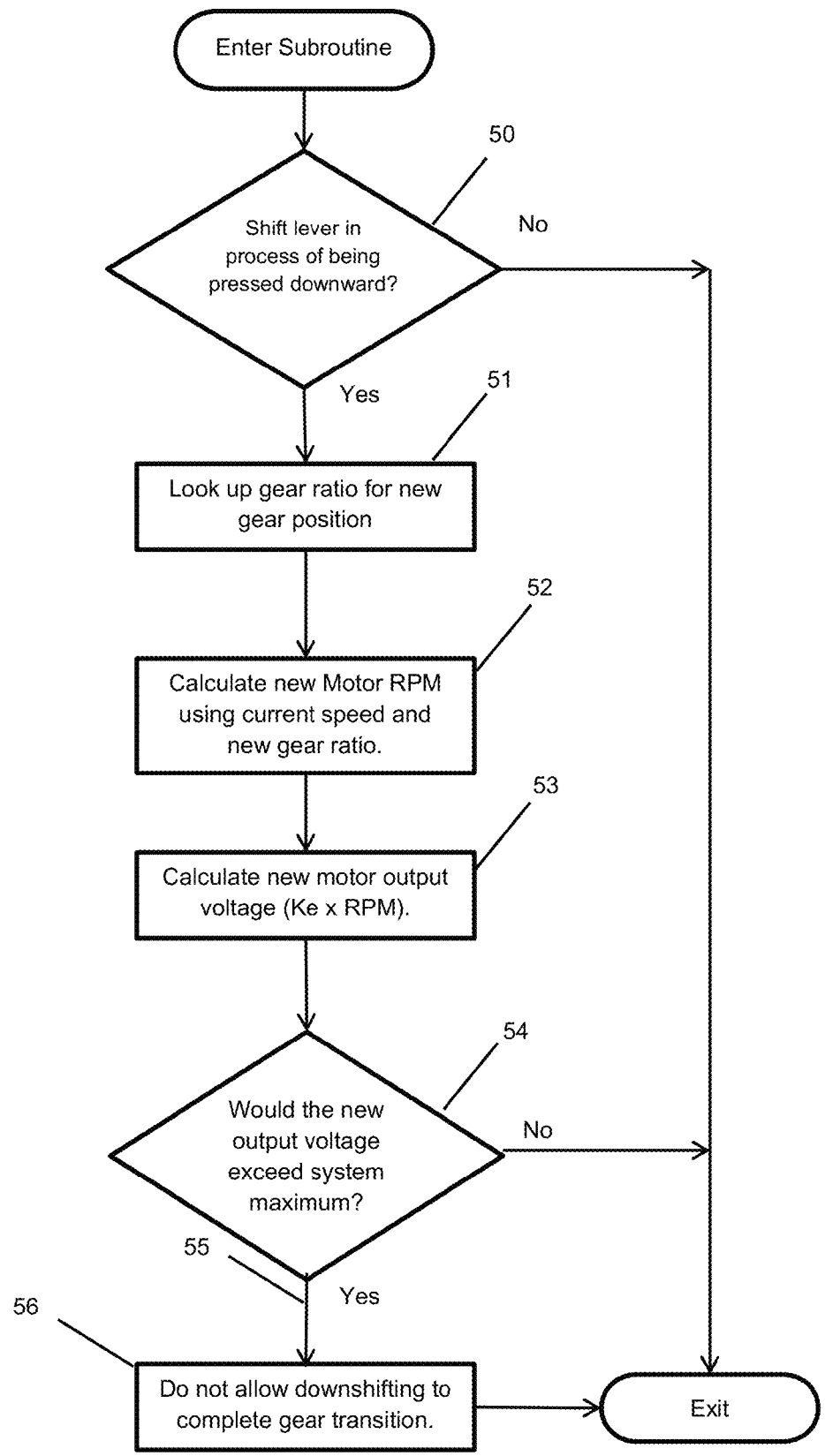
FIG. 10 is a flowchart illustrating an exemplary reactive gear selection process in accordance with one or more embodiments.

Exemplary algorithms for an electric motorcycle (or tricycle or ATV) overdrive lockout are shown in the flowcharts of FIGS. 9 and 10. These algorithms can be performed by the electric motorcycle's control unit (Vehicle Control Unit or Engine Control Unit), which knows the current gear being used in the gearbox, the vehicle's speed, and the motor's RPM. From this information, it can calculate what the next gear selection would do to the motor's speed.

The algorithm of FIG. 9 is predictive in operation and, in which, calculations are repeatedly done to predetermine if the next lower gear were to be selected, whether it would cause an overspin/overvoltage condition. If an overspin/overvoltage could take place, then actions are taken to prevent downshifting before it happens. The gear ratio for the next lower gear position is looked up at 40. At 41, the motor RPM is calculated by taking the current vehicle speed, the motor voltage constant ($K_e$), and the next lower gear ratio from what is currently being used. The output voltage is calculated at 42, and is then compared to the known system maximum parameters at 43. If it exceeds the maximum, then action is taken to prevent downshifting at 44, e.g., a solenoid is energized to prevent downshifting. This method works with both digital and analog gear position sensors.

With some sensors, the direction of the shift can be determined before the actual gear is selected, and the corrective action can take place if it is determined that the shift would produce a condition where the motor would overspin or produce an overvoltage that exceeds design parameters.

A reactive algorithm using this example is shown in FIG. 10. This time, the process starts with determining the direction of the shift in process (which can be accomplished if the gear sensor provides analog or linear position information through the gear shift range) at 50. If the shift direction is upward, the algorithm quickly exits. If the shift direction is downward, then the algorithm looks up the new lower gear ratio at 51. The current speed of the vehicle and the new gear ratio can then be used to calculate the new motor RPM value at 52. With the motor's calculated new RPM, the new voltage output can be calculated at 53 and then compared to see an overspin/overvoltage would result at 54. If the new gear produces an overspin/overvoltage condition 55, then action is taken to prevent the shift from completion and to remain in the current gear at 56.

To prevent a gear change from completing, a method to mechanically stop the shift takes place. Two examples follow: one external to the gearbox, and the other internal to the gearbox. There are numerous possible variations to each of these implementations, but it is understood that using generally any mechanical or other method (internal or external to the gearbox) to stop shifting would fall under the scope of this disclosure. In this application, FIGS. 11-13 describe an external approach to preventing a gear change, whereas FIGS. 14 and 15A-C describe an internal approach to preventing a gear change.

Figure 11:
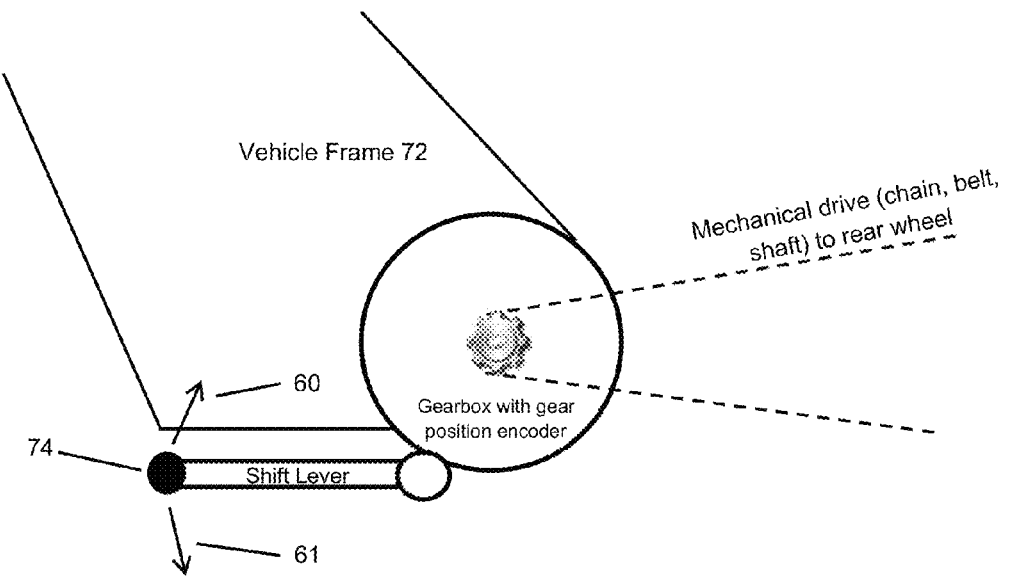
FIG. 11 is a simplified diagram illustrating an exemplary shift lever mechanically coupled with a gearbox.
Figure 12:
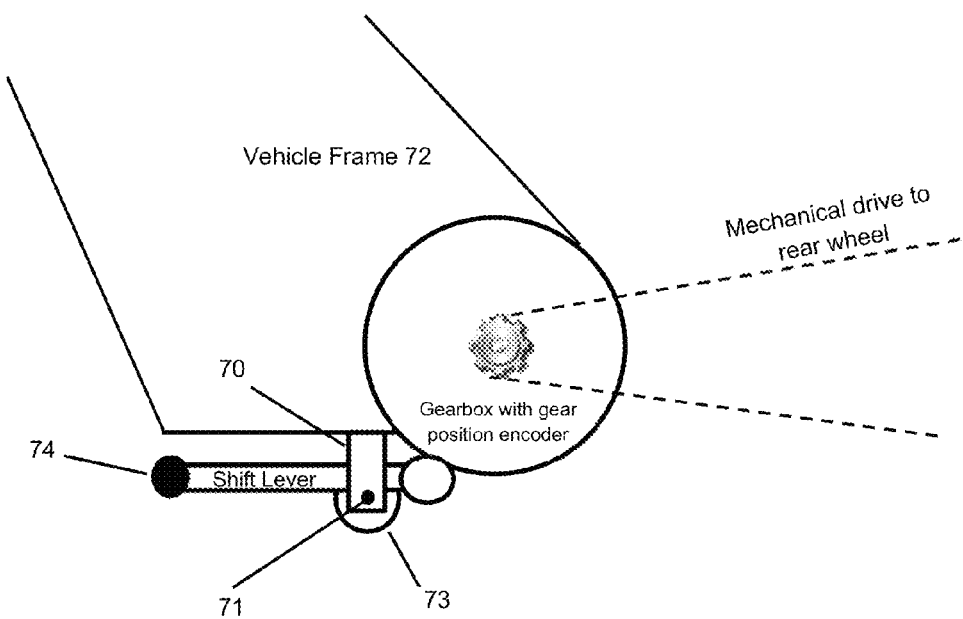
FIG. 12 is a simplified diagram illustrating an exemplary shift lever, a gearbox, and a regen protection solenoid in accordance with one or more embodiments.

The external approach to stopping a gear change shown in FIGS. 11-13 utilizes an electromagnetic solenoid under the shift lever of the vehicle. A typical shift lever 74 for a motorcycle is shown in FIG. 11. The lever is foot operated, and by moving the lever upward 60, a higher gear is selected. Conversely, a downward movement 61 on the lever will select a lower gear.

The modified version with the solenoid is shown in FIG. 12. The shift lever 74 pivots around the shift shaft in which the movement will cause selection of the next gear.

Adjacent to the shift lever is a metal plate 70 with a hole 71 slightly larger than the diameter of the solenoid piston in the center. This metal plate is attached to the vehicle frame 72. When the solenoid 73 is engaged, the solenoid's piston extends out and through the metal plate hole. This provides a mechanical reinforcement to prevent further downward motion of the shift lever. When the solenoid is de-energized, the piston retracts and the shift lever can move downward freely. Thus, by energizing and de-energizing the solenoid 73, the shift lever's downward movement can be respectively disabled or enabled.

Figure 13A:
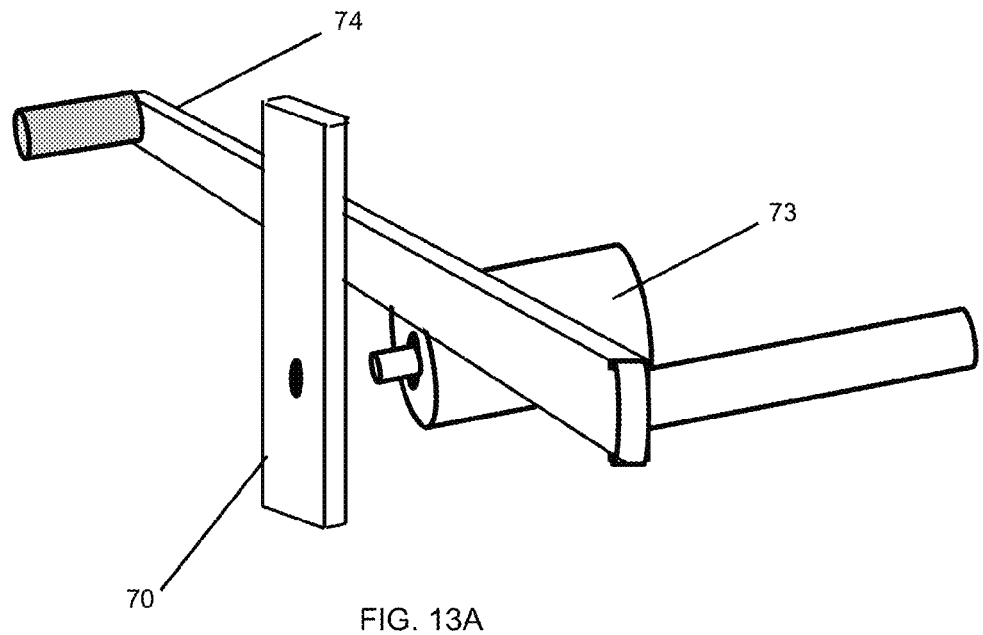
FIG. 13A is a perspective view of an exemplary shift lever with external regen protection solenoid in accordance with one or more embodiments.
Figure 13B:
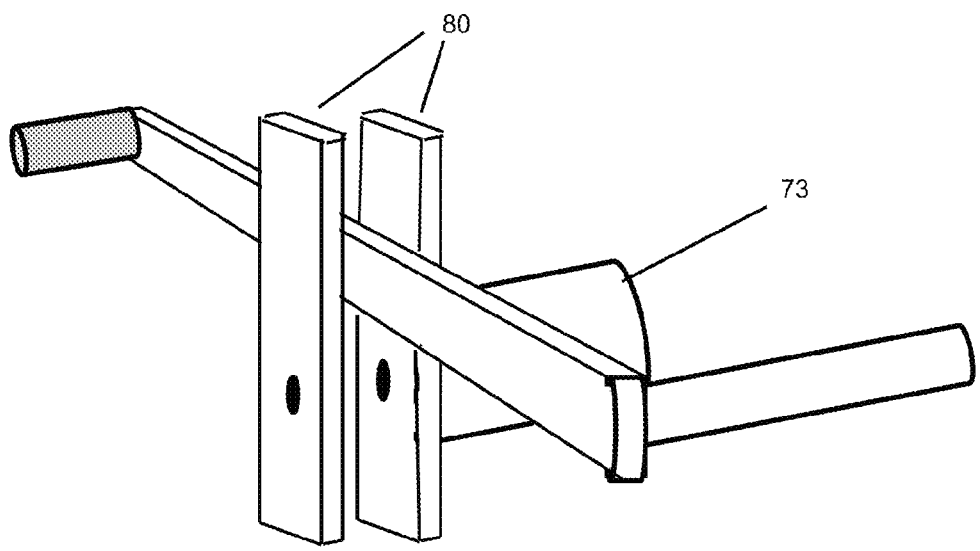
FIG. 13B is a perspective view of an alternate exemplary shift lever with external regen protection solenoid in accordance with one or more embodiments.

Two variations are shown in FIGS. 13A and 13B. The difference between the two is that FIG. 13B shows a more mechanically robust version as the pin is re-enforced on both sides 80 of the shift lever 74 when the solenoid piston is extended.

Figure 14:
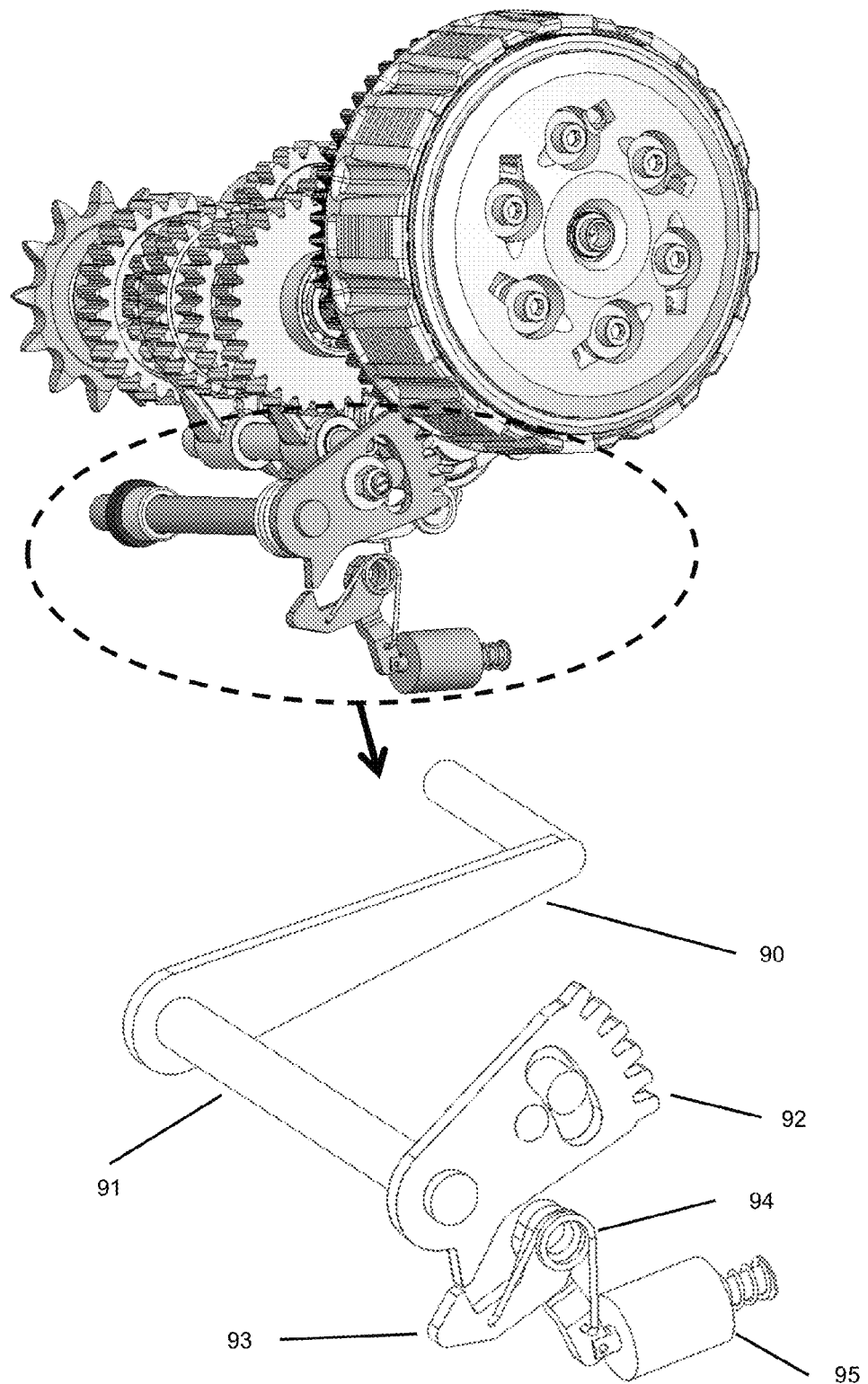
FIG. 14 is a perspective view of an exemplary gearbox with an internal regen protection lock mechanism with one or more embodiments.

An internal approach to stopping a gear change is shown in FIGS. 14 and 15A-15C. FIG. 14 shows the gearbox assembly, which includes the Shift Lever 90, shift shaft 91, shift shaft gear 92, shift lock 93, shift lock spring 94, and solenoid 95, which is discussed in further detail below. The shift shaft gear, shift lock, shift lock spring, and solenoid are internal to the gearbox unit, with the shift shaft extending from inside to the outside of the gearbox unit before being attached to the shift lever.

Figure 15A:
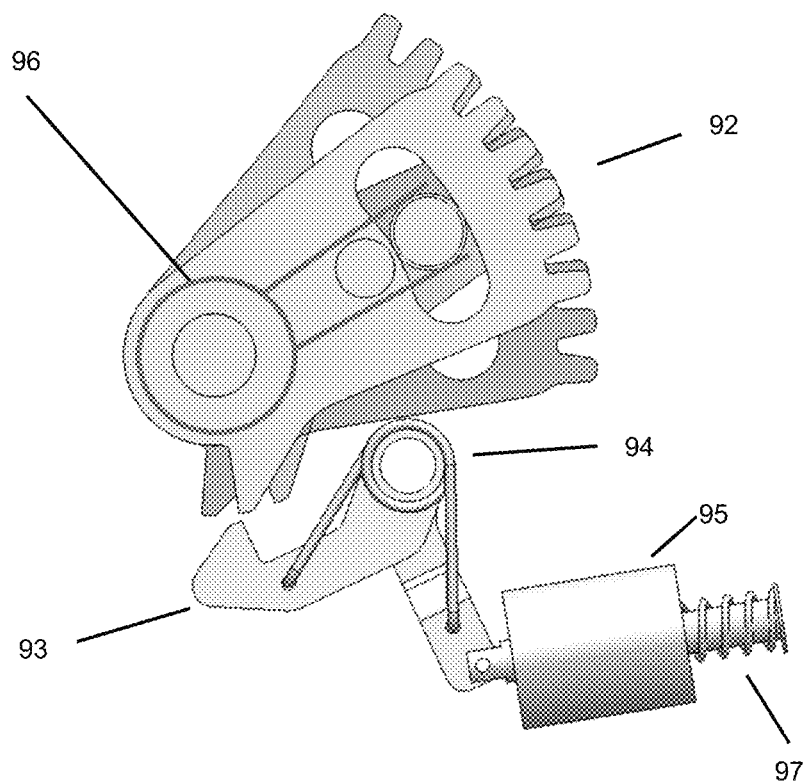
FIG. 15A is a side view of the internal regen protection lock mechanism of FIG. 14 showing normal gear selection with the overdrive lockout disabled.

FIG. 15A shows the shift shaft gear 92 in normal operation with the shift lock 93 inactive. The Solenoid piston is retracted due to the solenoid spring 97 expansion when the solenoid 95 is not energized, thus the shift shaft gear is able to freely move in either the up or down direction.

Figure 15B:
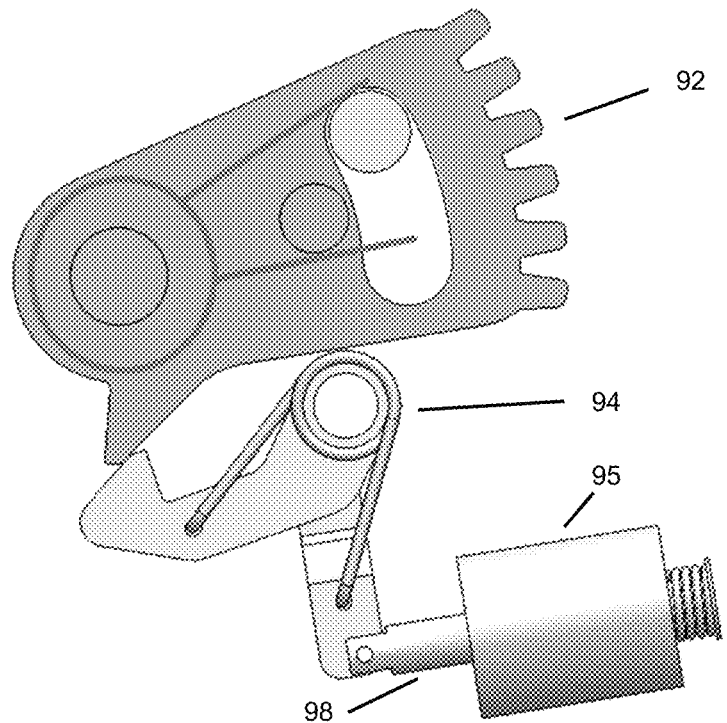
FIG. 15B is a side view of the internal regen protection lock mechanism of FIG. 14 showing the overdrive lockout enabled, resulting in downward gear selection being blocked.
Figure 15C:
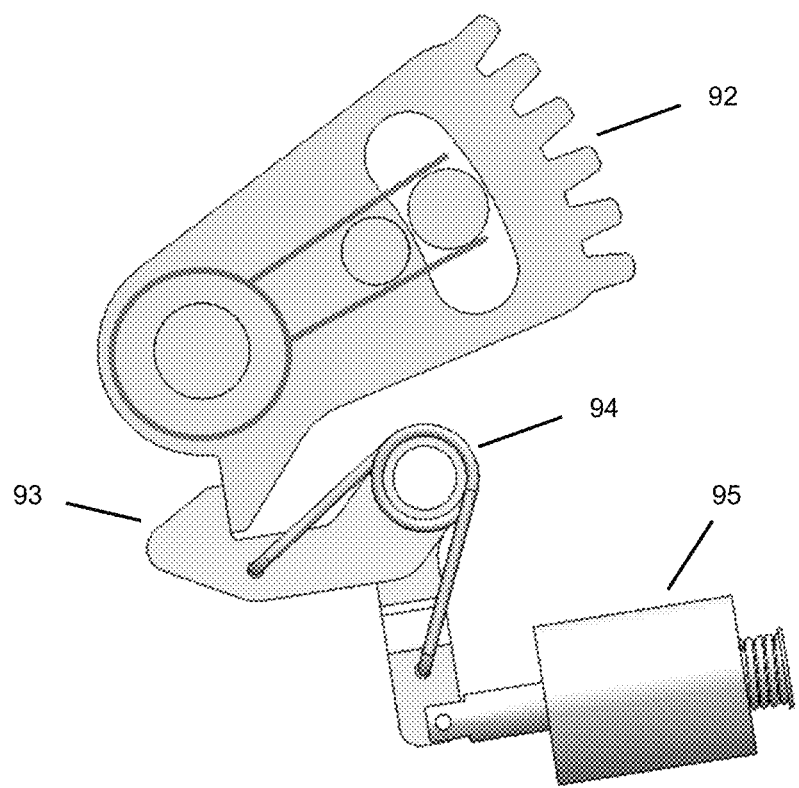
FIG. 15C is a side view of the internal regen protection lock mechanism of FIG. 14 showing the shift lever/gear in a neutral position and the overdrive lockout enabled.

FIG. 15B shows the overdrive lockout enabled by energizing the solenoid 95, which extends the solenoid piston 98. Because the algorithm described in FIG. 9 is constantly being executed, it is likely that the algorithm would immediately use the new lower gear (that has just engaged) as the selected gear before the driver fully releases the Shift Lever. In this case, the shift shaft gear 92 is allowed to spring back to a neutral position shown in FIG. 15A as the Shift Lever returns to Neutral position. However once the Shift Lever is in Neutral position, the Shift Lock spring 94 forces the Shift Lock 93 into place and prevents further downshifting until the overspin condition is removed. Once the potential overspin condition has been calculated to be removed, the Solenoid 95 can be de-energized which allows the Solenoid Spring 97 to un-compress and the solenoid piston will then retract and unlock the Shift Shaft Gear.

The algorithms for preventing over-shifting described above may be implemented in software, hardware, firmware, or any combination thereof. The processes are preferably implemented in one or more computer programs executing on a programmable device (e.g., in the vehicle control unit or engine control unit) including a processor and a storage medium readable by the processor (including, e.g., volatile and non-volatile memory and/or storage elements). Each computer program can be a set of instructions (program code) in a code module resident in the storage medium.

Having thus described illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same or similar functions.

Accordingly, the foregoing description and drawings are by way of example only, and are not intended to be limiting.

What is claimed is:

1. A method of preventing over-shifting in an electric vehicle having a multi-gear transmission and an electric motor operable in a drive mode and a regenerative braking mode, the method comprising the steps of:
   (a) predicting the speed of the electric motor resulting from downshifting from a current gear being used to a next lower gear based on a current speed of the electric vehicle, a current speed of the electric motor, and a gear ratio of the next lower gear;
   (b) determining if the speed of the electric motor predicted in (a) will cause an overvoltage condition from regenerative braking or an overspin condition in the electric motor;
   (c) preventing downshifting to the next lower gear when it is determined that the downshifting will cause an over-voltage condition or an overspin condition in the electric motor; and
   (d) repeating steps (a), (b), and (c) a plurality of times.

2. The method of claim 1, further comprising prior to step (a), determining if the multi-gear transmission is in the process of downshifting from the current gear being used to the next lower gear.

3. The method of claim 2, wherein determining if the multi-gear transmission is in the process of downshifting is performed using a gear sensor providing analog or linear gear position information.

4. The method of claim 1, the method steps are implemented in a vehicle control unit or an engine control unit of the electric vehicle.

5. The method of claim 1, wherein step (b) further comprises calculating an output voltage of the electric motor based on the predicted speed of the electric motor and a motor voltage constant.

6. The method of claim 1, wherein step (c) comprises energizing an electromagnetic solenoid to prevent movement of a shift lever outside a gear box unit of the multi-gear transmission or to prevent movement of a shift shaft gear inside the gear box unit.

7. The method of claim 1, further comprising enabling downshifting to the next lower gear when it is determined that the downshifting will not cause an overvoltage condition or an overspin condition in the electric motor.

8. The method of claim 1, wherein the electric vehicle comprises an electric motorcycle, an electric tricycle, or an electric all-terrain vehicle.

9. An electric vehicle, comprising:
- an electric motor operable in a drive mode and a regenerative braking mode;
- at least one drive wheel;
- a multi-gear transmission connected to the electric motor and the at least one drive wheel for transmitting torque therebetween;
- an energy storage system for providing power to the electric motor in the drive mode and being rechargeable by the electric motor in the regenerative braking mode;
- a downshifting prevention apparatus; and
- a vehicle control unit to prevent over-shifting in the electric vehicle, the vehicle control unit configured to:
  (a) predict the speed of the electric motor resulting from downshifting from a current gear being used to a next lower gear based on a current speed of the electric vehicle, a current speed of the electric motor, and a gear ratio of the next lower gear;
  (b) determine if the speed of the electric motor predicted in (a) will cause an overvoltage condition from regenerative braking or an overspin condition in the electric motor;
  (c) actuate the downshifting prevention apparatus to prevent downshifting when the vehicle control unit determines that downshifting to the next lower gear will cause an overvoltage condition or an overspin condition in the electric motor; and
  (d) repeat (a), (b), and (c) a plurality of times.

10. The electric vehicle of claim 9, further comprising a motor controller for controlling operation of the electric motor and a throttle coupled to the motor controller for regulating speed of the electric vehicle.

11. The electric vehicle of claim 9, further comprising a gear sensor providing analog or linear gear position information for determining if the multi-gear transmission is in the process of downshifting from the current gear being used to the next lower gear.

12. The electric vehicle of claim 9, wherein the vehicle control unit is further configured to calculate an output voltage of the electric motor based on the predicted speed of the electric motor and a motor voltage constant.

13. The electric vehicle of claim 9, wherein the downshifting prevention apparatus comprises a mechanism to prevent movement of a shift lever outside a gear box unit of the multi-gear transmission.

14. The electric vehicle of claim 13, wherein the mechanism to prevent movement comprises an electromagnetic solenoid having an extendable piston for restricting movement of the shift lever.

15. The electric vehicle of claim 9, wherein the downshifting prevention apparatus comprises a mechanism to engage a shift lock to prevent movement of a shift shaft gear inside a gear box unit of the multi-gear transmission.

16. The electric vehicle of claim 15, wherein the mechanism to engage a shift lock comprises an electromagnetic solenoid having an extendable piston.

17. The electric vehicle of claim 9, wherein the vehicle control unit is further configured to enable downshifting to the next lower gear when it determines that the downshifting will not cause an overvoltage condition or an overspin condition in the electric motor.

18. The electric vehicle of claim 9, wherein the electric vehicle comprises an electric motorcycle, an electric tricycle, or an electric all-terrain vehicle.

* * * * *